United States Patent
Tamura et al.

(10) Patent No.: US 10,428,178 B2
(45) Date of Patent: Oct. 1, 2019

(54) POLYESTER RESIN FOR TONER, METHOD FOR PRODUCING POLYESTER RESIN FOR TONER, AND TONER

(71) Applicant: Mitsubishi Chemical Corporation, Chiyoda-ku (JP)

(72) Inventors: Yoko Tamura, Tokyo (JP); Tadahiro Ozawa, Tokyo (JP); Akifumi Kondo, Tokyo (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 0 days.

(21) Appl. No.: 15/542,118

(22) PCT Filed: Jan. 20, 2016

(86) PCT No.: PCT/JP2016/051532
§ 371 (c)(1),
(2) Date: Jul. 7, 2017

(87) PCT Pub. No.: WO2016/117590
PCT Pub. Date: Jul. 28, 2016

(65) Prior Publication Data
US 2018/0258220 A1  Sep. 13, 2018

(30) Foreign Application Priority Data
Jan. 22, 2015  (JP) .................................. 2015-009929

(51) Int. Cl.
| | |
|---|---|
| C08G 63/02 | (2006.01) |
| C08G 63/672 | (2006.01) |
| C08G 63/133 | (2006.01) |
| C08G 63/78 | (2006.01) |
| G03G 9/087 | (2006.01) |

(52) U.S. Cl.
CPC ......... *C08G 63/672* (2013.01); *C08G 63/133* (2013.01); *C08G 63/78* (2013.01); *G03G 9/08755* (2013.01); *G03G 9/08795* (2013.01); *G03G 9/08797* (2013.01)

(58) Field of Classification Search
USPC ................................. 528/193, 194, 196, 198
See application file for complete search history.

(56) References Cited

U.S. PATENT DOCUMENTS

2009/0162778 A1  6/2009  Sasaki et al.

FOREIGN PATENT DOCUMENTS

| | | |
|---|---|---|
| JP | 61-188417 A | 8/1986 |
| JP | 61-188418 A | 8/1986 |
| JP | 2-82267 A | 3/1990 |
| JP | 2-161467 A | 6/1990 |
| JP | 6-56974 A | 3/1994 |
| JP | 6-128367 A | 5/1994 |
| JP | 10-60104 A | 3/1998 |
| JP | 2009-116355 A | 5/2009 |
| JP | 2009-151101 A | 7/2009 |
| JP | 2010-204318 A | 9/2010 |
| JP | 2011-28170 A | 2/2011 |
| JP | 2012-255083 A | 12/2012 |
| JP | 2015-10199 A | 1/2015 |
| WO | WO 00/52533 A1 | 9/2000 |

OTHER PUBLICATIONS

Japanese Office Action dated Jan. 9, 2018 in Patent Application No. 2017-066325 (with English translation), citing documents AO-AS and AX therein, 7 pages.
"Chemical Toner" The Imaging Society of Japan, Tokyo Denki University Press, 1st Edition, Nov. 30, 2008, pp. 56-63 and cover pages (with partial English translation).
International Search Report dated Apr. 19, 2016, in PCT/JP2016/051532, filed Jan. 20, 2016.
Office Action dated Aug. 28, 2018 in corresponding Japanese Patent Application No. 2017-207270 (with English Translation), 6 pages.
Office Action dated Aug. 28, 2018, in Chinese patent application No. 201680004250.X (w/English translation)—18 pages.
Office Action dated Sep. 7, 2018, in Korean patent application No. 10-2017-7016884 (w/English translation)—15 pages.
Decision of Rejection dated Dec. 21, 2018, in Korean patent application No. 10-2017-7016884 (w/English translation)—8 pages.

*Primary Examiner* — Terressa Boykin
(74) *Attorney, Agent, or Firm* — Oblon, McClelland, Maier & Neustadt, L.L.P.

(57) ABSTRACT

The invention relates to a polyester resin for toner to be used in the development of an electrostatic image or magnetic latent image in electrophotography, electrostatic recording, electrostatic printing, or the like, a method for producing a polyester resin for toner, and a toner, and an object of the invention is to provide, with excellent productivity and stability, a polyester resin for toner having excellent storage stability, hot offset resistance, and low temperature fixing property as toner while still considering the environmental protection and safety. A polyester resin for toner contains 40 mol % or more and 60 mol % or less of structural units derived from tri- or higher hydric carboxylic acids based on 100 mol % of structural units derived from all acid components, and has a metal content of 100 ppm or less.

16 Claims, No Drawings

POLYESTER RESIN FOR TONER, METHOD FOR PRODUCING POLYESTER RESIN FOR TONER, AND TONER

TECHNICAL FIELD

The present invention relates to a polyester resin for toner, a method for producing a polyester resin for toner, and a toner.

This application claims the benefit of priority of the Japanese Patent Application No. 2015-009929 filed in Japan on Jan. 22, 2015, and the contents of which are incorporated herein by reference.

BACKGROUND ART

In the method for obtaining an image by an electrophotographic printing method and an electrostatic printing method, an electrostatic image formed on a photosensitive member is developed with toner charged in advance by friction and then fixed. As the fixing technique, there are a heat roller technique in which the toner image is fixed by using a pressurized and heated roller and a non-contact fixing technique in which the toner image obtained by development is fixed using an electric oven or flash beam light. In order to pass through these processes without any problem, toner is firstly required to be able to maintain a stable charged amount, and next, to exhibit a favorable fixing property on the paper. Furthermore, as the device has a fixing part as a heating member and there is a temperature increase inside the device, toner is required not to cause a blocking. It is also required that, even during continuous printing, no contamination of the device or fog on a printed surface is not shown, namely, durability of toner is required.

Moreover, with regard to the heat roller technique, having low temperature in a fixing part is under progress from the viewpoint of energy saving, and the toner is strongly required to have a characteristic of being fixed on paper at relatively low temperature, i.e., to have a low temperature fixing property. In addition, since having a device in more compact form is now under progress and a roller not coated with a release agent is used, toner is strongly required to have a peeling property from a heat roller, that is, the demanded for offset resistance has been increasing.

As a binder resin for toner, a polyester resin, which is excellent in toughness and fixing property at a low temperature and exhibits a favorable performance balance, receives particular attention in recent years.

From the viewpoint of energy saving or the like, it is recently desired to have a binder resin which can provide toner having good fixing property at a low temperature. As for the polyester resin, due to the reason of having also the hot offset resistance at a high temperature, having a design such that a branched or crosslinked structure is included in the resin by using a tri- or higher hydric carboxylic acid component or alcohol component is widely carried out in general. However, there is a problem that, when a large amount of a tri- or higher hydric monomer is copolymerized, it is difficult to control the polycondensation reaction.

With regard to the problem described above, disclosed in Patent Literature 1, for example, is a method of suppressing a rapid increase in viscosity in reaction system even for a case of copolymerizing a large amount of tri- or higher hydric carboxylic acid component by adjusting the vacuum degree within a predetermined range during polycondensation reaction. Furthermore, in Patent Literature 2, for example, polyester for toner containing aliphatic diol in a specific amount or more and tri- or higher hydric carboxylic acid in which metal elements are not more than a specific amount is disclosed. According to Patent Literature 2, a binder for toner which does not substantially contain a polymerization catalyst and is excellent in transparency and electrostatic property is disclosed.

However, because dibutyl tin oxide is used as a polymerization catalyst in Patent Literature 1, there is concern regarding the safety. Furthermore, according to Patent Literature 1, a desired resin cannot be obtained by gellation and, in a case in which a desired resin is obtained, a long period of time is required for polycondensation reaction, or the like so that there is still a room for improvement in terms of production conditions. Incidentally, in Patent Literature 2, aromatic diol is not used as an alcohol component while only an example of using ethylene glycol is given. As such, there is concern regarding the problems associated with toner characteristics like blocking resistance and electrostatic characteristic. Also of concern are, in such molecular structure, easy exhibition of a crystal structure in part of the structure and a negative influence exhibited on the toner characteristics.

CITATION LIST

Patent Literature

Patent Literature 1: JP1994-56974 A
Patent Literature 2: JP 2011-28170 A

DISCLOSURE OF THE INVENTION

Problem to be Solved by the Invention

Under the circumstances, an object of the invention is to provide a method for producing with high productivity and stability a polyester resin for toner having excellent storage stability, hot offset resistance, and low temperature fixing property as a toner while still considering the environmental protection and safety.

Means for Solving Problem

Summary of the invention is as follows.

(1) A polyester resin for toner containing, 40 mol % or more and 60 mol % or less of structural units derived from tri- or higher hydric carboxylic acid based on 100 mol % of structural units derived from all acid components, and a metal content of 100 ppm or less.

(2) The polyester resin for toner described in (1), in which the metal is at least one kind selected from the groups of Ti, Sb, Sn, Ge, Al, Zr, Mg, Zn, Ca, and P.

(3) Furthermore, the gist of the invention is a polyester resin for toner in which, molecular weight of 5,000 or less of the polyester resin is 38% by weight or more and molecular weight of 200,000 or more of the polyester resin is 7% by weight or more, and a glass transition temperature of the polyester resin is 50° C. or higher, wherein the molecular weight is measured by GPC measurement.

(4) The polyester resin for toner described in any one of (1) to (3), in which 90 mol % or more of the structural units derived from bisphenol A alkylene oxide adduct are contained based on 100 mol % of structural units derived from all acid components.

(5) The polyester resin for toner described in (4), in which the bisphenol A alkylene oxide adduct contains a bisphenol A propylene oxide adduct.

(6) The polyester resin for toner described in any one of (1) to (5), in which a softening temperature is 125° C. or lower.

(7) The polyester resin for toner described in any one of (1) to (6), in which insolubles in methyl ethyl ketone and ethyl acetate are less than 5% by mass.

(8) Furthermore, the gist of the invention is a method for producing a polyester resin for toner in which, polymerizing a carboxylic acid component containing 40 mol % or more and 60 mol % or less of tri- or higher hydric carboxylic acid component based on 100 mol % of all acid components, and an alcohol component, wherein the polymerization was conducted under 100 ppm or less of a polymerization catalyst.

(9) The method for producing the polyester resin for toner described in (8), in which the polymerization is conducted by the number of hydroxyl groups in all alcohol components is 1.20 or more and 1.40 or less when the number of carboxy groups in all acid components is 1.

(10) The method for producing the polyester resin for toner described in (8) or (9), in which, an alcohol component containing 60 mol % or more and 80 mol % or less of bisphenol A alkylene oxide adduct is used when all alcohol components is 100 mol %.

(11) The method for producing the polyester resin for toner described in (10), in which the bisphenol A alkylene oxide adduct contains a bisphenol A propylene oxide adduct.

(12) A toner containing the polyester resin for toner described in any one of (1) to (7).

(13) The toner described in (12), in which the toner is chemical toner.

Effect of the Invention

The polyester resin for toner of the invention has excellent hot offset resistance, low temperature fixing property, or the like as a toner while the environmental protection and safety are being considered.

BEST MODE(S) FOR CARRYING OUT THE INVENTION

Herein below, the polyester resin for toner of the invention is explained.
(Polyester Resin for Toner)

The polyester resin for toner of the invention contains, 40 mol % or more and 60 mol % or less of structural units derived from tri- or higher hydric carboxylic acid based on 100 mol % of structural units derived from all acid components, and has a metal content of 100 ppm or less.

As for the above metal, a metal derived from a polymerization catalyst such as Ti, Sb, Sn, Ge, Al, Zr, Mg, Zn, Ca, or P can be mentioned.

In the polyester resin for toner of the invention, the tri- or higher hydric carboxylic acid component is preferably 40 mol % or more and 60 mol % or less, and more preferably 40 mol % or more and 55 mol % or less based on 100 mol % of all acid components.

As containing the tri- or higher hydric carboxylic acid component at 40 mol % or more, toner to be obtained tends to have a favorable fixing property and hot offset resistance. Furthermore, as it is 60 mol % or less, the gellation reaction at the time of polycondensation reaction tends to become easier and also the storage stability of toner to be obtained tends to be improved more.

As for the tri- or higher hydric carboxylic acid component which can be used in the invention, there are trimellitic acid, 1,2,4-cyclohexanetricarboxylic acid, 2,5,7-naphthalenetricarboxylic acid, 1,2,4-naphthalenetricarboxylic acid, 1,2,5-hexanetricarboxylic acid, or esters or anhydrides of them, pyromellitic acid, and 1,2,7,8-octanetetracarboxylic acid, or esters or anhydrides of them. From the viewpoint of easy industrial obtainability, trihydric carboxylic acid is preferable, and trimellitic acid or an acid anhydride thereof is particularly preferable.

For the polyester resin for toner of the invention, other than the aforementioned tri- or higher hydric carboxylic acid, polyhydric carboxylic acid such as aromatic polyhydric carboxylic acid or aliphatic polyhydric carboxylic acid may be used.

As for the polyhydric carboxylic acid, an aromatic dicarboxylic acid component such as terephthalic acid, isophthalic acid, phthalic acid, dimethyl terephthalate, dimethyl isophthalate, diethyl terephthalate, diethyl isophthalate, dibutyl terephthalate and dibutyl isophthalate, or esters or anhydrides of them; and an aliphatic dicarboxylic acid component such as succinic acid, adipic acid, isodecylsuccinic acid, dodecenylsuccinic acid, maleic acid, fumaric acid, or esters or anhydrides of them can be used.

Use amount of the aromatic dicarboxylic acid component is, although not particularly limited, preferably 35 mol % or more and 60 mol % or less, and more preferably 40 mol % or more and 60 mol % or less based on 100 mol % of all acid components. When the use amount of the aromatic dicarboxylic acid component is 35 mol % or more, there is a tendency that the storage stability of toner is improved and the resin strength is enhanced. When the use amount is 60 mol % or less, a favorable fixing property or hot offset resistance of toner is yielded. Among the aromatic dicarboxylic acids, from the viewpoint of the handling property and cost, terephthalic acid or isophthalic acid is preferable.

It is preferable for the polyester resin for toner of the invention to contain a structural unit derived from an alkylene oxide adduct of bisphenol A. In case of containing a structural unit derived from an alkylene oxide adduct of bisphenol A, the content is preferably 60 mol % or more and 80 mol % or less, and more preferably 65 mol % or more and 80 mol % or less based on 100 mol % of all alcohol. As the content is 60 mol % or more, it becomes easier to control the gellation reaction rate at the time of a polycondensation reaction and also the storage stability, electrostatic property, and durability of toner to be obtained tend to improve. Furthermore, when the content is 80 mol % or less, it is preferable from the viewpoint of the reactivity and cost.

The bisphenol A alkylene oxide adduct which may be used for the polyester resin for toner of the invention is not particularly limited, and examples thereof include a propylene oxide adduct or an ethylene oxide adduct of bisphenol A, and addition mole number is preferably 2 to 6. Specific examples thereof include polyoxyethylene-(2.0)-2,2-bis(4-hydroxyphenyl)propane, polyoxyethylene-(2.2)-2,2-bis(4-hydroxyphenyl)propane, polyoxyethylene-(2.3)-2,2-bis(4-hydroxyphenyl)propane, polyoxypropylene-(2.0)-2,2-bis(4-hydroxyphenyl)propane, polyoxypropylene (2.2)-2,2-bis(4-hydroxyphenyl)propane, polyoxypropylene-(2.3)-2,2-bis(4-hydroxyphenyl)propane, polyoxypropylene-(2.4)-2,2-bis(4-hydroxyphenyl)propane, polyoxypropylene (3.3)-2,2-bis(4-hydroxyphenyl)propane, polyoxypropylene (6)-2,2-bis(4-hydroxyphenyl)propane, and polyoxypropylene (2.2)-polyoxyethylene-(2.0)-2,2-bis(4-hydroxyphenyl)propane.
They may be used either singly or in combination of two or more types.

Furthermore, for the polyester resin for toner of the invention, aliphatic diol or the like may be used as polyhydric alcohol. Examples of the aliphatic diol include ethylene glycol, diethylene glycol, triethylene glycol, polyethylene glycol, neopentyl glycol, propylene glycol, 1,3-propane diol, 1,4-butane diol, 1,4-cyclohexane dimethanol, and isosorbide. They may be used either singly or in combination of two or more types. It is also possible to use aliphatic diol in combination of aromatic diol.

Other than those diols above, tri- or higher hydric polyhydric alcohol may be used as polyhydric alcohol within a range in which the effect of the invention is not negatively affected by it. Examples of the tri- or higher hydric polyhydric alcohol include sorbitol, 1,2,3,6-hexatetralol, 1,4-sorbitan, pentaerythritol, dipentaerythritol, tri pentaerythritol, 1,2,4-butane triol, 1,2,5-pentane triol, glycerol, 2-methyl-1,2,3-propane triol, 2-methyl-1,2,4-butane triol, trimethylol propane, and 1,3,5-trihydroxy methylbenzene. They may be used either singly or in combination of two or more types. Among them, pentaerythritol and trimethylolpropane are particularly preferable.

Furthermore, in the polyester resin for toner of the invention, molecular weight of 5,000 or less is 38% or more and molecular weight of 200,000 or more is 7% by weight or more according to molecular weight measurement using GPC, and a glass transition temperature is 50° C. or higher. When molecular weight of 5,000 or less is 38% by weight or more, the low temperature fixing property is excellent. Furthermore, when molecular weight of 200,000 or more is 7% by weight or more, the hot offset resistance is excellent. The polyester resin for toner of the invention has metal content of 100 ppm or less, preferably 50 ppm or less, and more preferably 20 ppm or less. Examples of the metal include a metal derived from a polymerization catalyst such as Ti, Sb, Sn, Ge, Al, Zr, Mg, Zn, Ca, or P.

As the content of metal derived from a polymerization catalyst is 100 ppm or less, a polyester resin with controlled gellation reaction or the can be obtained like at the time of polycondensation.

In the polyester resin for toner of the invention, molecular weight of 5,000 or less is 38% or more and molecular weight of 200,000 or more is 7% by weight or more. As they are within the above range, an excellent effect can be obtained in terms of a low temperature fixing property and hot offset resistance.

In the polyester resin for toner of the invention, it is preferable that insolubles in methyl ethyl ketone and ethyl acetate are less than 5% by mass. As the solvent insolubles are less than 5% by mass, it is suitable for a toner subject which is produced by a production method including a step of dissolving in a solvent.

(Method for Producing Polyester Resin for Toner)

The polyester resin for toner of the invention is polymerized by a carboxylic acid component containing 40 mol % or more and 60 mol % or less of tri- or higher hydric carboxylic acid component based on 100 mol % of all acid components, and an alcohol component, and the polymerization was conducted by 0 ppm to 100 ppm of a polymerization catalyst.

Furthermore, with regard to the ratio between the carboxylic acid component and alcohol component of the method for producing a polyester resin for toner of the invention, the number of hydroxyl groups is preferably 1.20 or more and 1.40 or less and more preferably 1.23 or more and 1.35 or less when the number of carboxy groups in all raw materials is 1.

As the number of hydroxyl groups is 1.20 or more when the number of carboxy groups is 1, gellation can be easily controlled at the time of polycondensation reaction so that there is a tendency of having favorable storage stability of toner. Furthermore, as it is 1.40 or less, there is a tendency that more favorable reactivity is obtained and more favorable storage stability of toner to be obtained is shown.

Furthermore, in case of using an acid anhydride, the number of carboxy groups is calculated similar to the case of having no anhydride. Furthermore, the number of hydroxyl groups does not include the OH group present in carboxy group.

Furthermore, considering the performance as a binder resin, the polyester resin for toner which is obtained by the production method of the invention is preferably non-crystalline. Accordingly, it is important to suitably adjust the type or ratio of each raw material component.

It is preferable for the polyester resin for toner of the invention that increase rate of a softening temperature of a polyester resin against polycondensation reaction time is within a range of 0.1° C./minute or more and 0.6° C./minute or less, and the production is made such that the softening point of a polyester resin obtained after polycondensation reaction is 125° C. or lower.

Like the invention, if the tri- or higher hydric carboxylic acid is contained in an amount of 40 mol % or more and 60 mol % or less based on 100 mol % of all acid components, the progress rate of the reaction is increasingly accelerated while the polymerization degree is increased simultaneously, and thus it is difficult to obtain stably the resin if the softening temperature is increased over 125° C. Lower limit of the softening point is preferably 110° C. or higher from the viewpoint of the hot offset resistance.

As for the method for polymerizing the polyester resin for toner of the invention, mention can be made of a method in which a monomer mixture containing polyhydric alcohol, polyhydric carboxylic acid, and a lower alkyl ester thereof is added to a reaction vessel, water or lower alkyl alcohol is distilled off according to an esterification reaction or an ester exchange reaction, and polymerization degree is increased to obtain a resin while removing glycol from the polycondensation reaction.

The temperature for an esterification reaction or an ester exchange reaction with regard to the method for producing the polyester resin for toner of the invention is preferably 240° C. or higher and 280° C. or lower, and more preferably 255° C. or higher and 270° C. or lower. As it is 240° C. or higher, the productivity is improved, and therefore preferable. Furthermore, in case of 280° C. or lower, there is a tendency that the decomposition of resin or generation of a by-product of volatile components which is a cause of malodor can be suppressed, and therefore preferable.

According to the polyester resin for toner of the invention, the increase rate of a softening temperature against polycondensation reaction time is within a range of 0.1° C./minute or more and 0.6° C./minute or less, and the resin is preferably produced at the conditions that it is obtained by the following formula (1).

(Softening temperature of polyester resin at end point of polycondensation reaction:° C.)−(Softening temperature of polyester resin before end of polycondensation reaction:° C.)÷(Polycondensation reaction time:minutes)     (1)

With regard to the polycondensation reaction time, the start point and end point are decided based on the following criteria, and the time between those points is set as polycondensation reaction time. Incidentally, it is necessary to determine in advance the relationship between the torque applied to stirring wings inside a reaction apparatus and softening temperature to be obtained with regard to composition, reaction apparatus, production conditions, or the like.

Start point: a time point at which, after completion of esterification or ester exchange reaction, temperature of a reaction system is adjusted to a temperature for polycondensation reaction, and then pressure inside the system is lowered.

End point: a time point at which, after having the polycondensation reaction at predetermined vacuum level to progress until the torque applied to stirring wings of a reaction apparatus exhibits a desired softening temperature, stirring is terminated while simultaneously starting introduction of nitrogen to the inside of a system to increase the pressure inside the system to normal pressure.

By setting the increase rate of a softening temperature against polycondensation reaction at 0.1° C./minute or more, there is a tendency that a resin with desired softening temperature can be obtained within a short time, and generation of a by-product of volatile components which is a cause of malodor can be suppressed.

Furthermore, by setting the increase rate of a softening temperature against polycondensation reaction at 0.6° C./minute or less, it is possible to have a sufficient time window in which the resin inside a reaction system exhibits a desired softening temperature, and a resin with desired physical property can be stably obtained.

To have the increase rate of a softening temperature against polycondensation reaction time within a range of 0.1° C./minute or more and 0.6° C./minute or less, there is a means as follows, and considering the ratio of raw material composition or the like, preparation can be made by using it either singly or in combination thereof. In case of the composition ratio with excellent reactivity, in particular, including a small amount of an alkylene oxide adduct of bisphenol A, a large amount of a tri- or higher hydric acid component, a low number of hydroxyl group when the number of the carboxy group is 1, or the like, it is effective that the polymerization catalyst is not used and the polycondensation reaction temperature is set at a low level.

1) Amount of Polymerization Catalyst

By setting the amount of the polymerization catalyst at suitable level, the reaction rate can be adjusted. Because the polyester resin for toner of the invention is produced by using a composition having a large amount of branched structure and rich reactivity, it is preferable to have the reaction at a condition at which the polymerization catalyst is 100 ppm or less. It is more preferably 50 ppm or less, and even more preferably 20 ppm or less.

In case of using a polymerization catalyst, a known polymerization catalyst such as titan tetraalkoxide, titan oxide, tin acetate, tin oxide, zinc acetate, tin disulfide, antimony trioxide, germanium dioxide, magnesium acetate, calcium acetate, an aluminum compound, a phosphorus compound, or a zirconium compound can be used.

2) Temperature for Polycondensation Reaction.

By suitably setting the reaction temperature, the polycondensation reaction stability and gellation stability can be surely obtained.

The temperature for polycondensation reaction is preferably 210° C. or higher and 250° C. or lower. That is because, as the temperature for polycondensation reaction is 210° C. or higher, there is a tendency that more favorable productivity is obtained, and as the temperature for polycondensation reaction is 250° C. or lower, there is a tendency that decomposition of the resin is suppressed so that favorable productivity is obtained and generation of a by-product of volatile components which is a cause of malodor can be suppressed.

The glass transition temperature (hereinbelow, referred to as Tg) of the polyester resin for toner of the invention is 50° C. or higher and 65° C. or lower, although it is not particularly limited. When Tg is 50° C. or higher, there is a tendency that the blocking resistance of toner is improved. Furthermore, when Tg is 65° C. or lower, there is a tendency that the fixing property of toner is improved.

Furthermore, the acid value of the non-crystalline polyester resin for toner of the invention is preferably 25 mgKOH/g or less, and more preferably 20 mgKOH/g or less, although it is not particularly limited. When the acid value is 25 mg KOH/g or less, there is a tendency that the image density of toner is stabilized.

Next, explanations are given for toner in which the polyester resin for toner of the invention is used.

The polyester resin for toner of the invention can be used either as a toner binder itself or as a blend with other toner binder resin. When a binder resin other than the polyester resin of the invention is used as a binder resin, examples thereof include a polyester resin other than the polyester resin of the invention, a styrene-based resin, a styrene-acrylic resin, a cyclic olefin resin, a methacrylic acid-based resin, and an epoxy resin. Furthermore, within a range in which the effect of the invention is not impaired by it, it may be used either singly or as a mixture of two or more kinds.

As for the method for producing toner of the invention, although it is not particularly limited, the production can be made by mixing the toner binder resin containing the polyester resin of the invention, a coloring agent, a release agent, a charge control agent, a fluidity modifying agent, and a magnetic substance or the like, melt kneading them using a biaxial extruder or the like, performing coarse grinding, fine grinding, and classification, and then performing an external addition treatment of inorganic particles and the like, if necessary. Furthermore, it is also possible to perform in the above process a treatment of preparing toner particles in sphere shape after fine grinding to classification.

Furthermore, the polyester resin for toner of the invention may be also used for production of toner using an organic solvent. As for the method for producing toner using an organic solvent, there is a method in which, by dissolving or dispersing the polyester resin and materials containing other toner blends in an organic solvent in which the polyester resin can be dissolved, and granulating in an aqueous medium containing a dispersion stabilizer the dissolved solution or dispersion, then removing the organic solvent therefrom and washing and drying the resulting granules, toner particles are obtained, and a method in which, by dissolving the polyester resin in an organic solvent, emulsifying the dissolved solution in an aqueous medium followed by removal of the organic solvent to obtain a polyester emulsion, and by combining it with an aqueous medium in which other toner blends are finely dispersed, aggregating and thermally fusing fine particles to obtain particles, and by separating the obtained particles followed by washing and drying, toner particles are obtained. If necessary, an external addition agent like fluidity modifying agent may be added to the obtained toner particles.

Examples of the coloring agent which is used at the time of preparing toner include carbon black, nigrosine, aniline blue, phthalocyanine blue, phthalocyanine green, Hansa yellow, Rhodamine-based dye and pigment, chrome yellow, quinacridone, benzidine yellow, rose bengal, a triarylmethane-based, a monoazo-based, a disazo-based, and a condensed azo-based dye and pigment. Those dye and pigment may be used either singly or as a mixture of two or more types. In case of full color toner, benzidine yellow, a monoazo-based dye and pigment, and a condensed azo-based dye and pigment may be mentioned for yellow, quinacridone, Rhodamine-based dye and pigment, and a monoazo-based dye and pigment may be mentioned for magenta, and phthalocyanine blue may be mentioned for cyan.

Content of the coloring agent is preferably 2% by mass or more and 10% by mass or less in toner from the viewpoint of color hue, image density, and heat characteristics of toner.

As the charge control agent, a quaternary ammonium salt or a basic or electron donating organic substance and the like may be exemplified as a positive charge control agent, and a metal chelate, a metal-containing dye, an acid or electron withdrawing organic substance and the like may be exemplified as a negative charge control agent. In the case of color toner, it is preferable that the charge control agent be colorless or have a light color so as not to damage the color tone of toner, and examples thereof include a salt of salicylic acid or alkyl salicylic acid with a metal such as chromium, zinc and aluminum, a metal complex, an amide compound, a phenol compound and a naphthol compound. Moreover, a styrene-based, an acrylic acid-based, a methacrylic acid-based, and a vinyl polymer having a sulfonic acid group may be used as a charge control agent.

The content of the charge control agent is preferably 0.5% by mass or more and 5% by mass or less in toner. The charged amount of toner tends to be at a sufficient level in a case in which the content of the charge control agent is 0.5% by mass or more and a decrease in charged amount due to aggregation of the charge control agent tends to be suppressed in a case in which the content is 5% by mass or less.

As the release agent which is added at the time of preparing toner, carnauba wax, rice wax, montan was, bee wax, polypropylene-based wax, polyethylene-based wax, synthetic ester-based wax, paraffin wax, fatty acid amides, and silicone-based wax can be mentioned. Each may be used either singly in combination of two or more kinds.

Because the release property, storage property, fixing property, color exhibiting property, and the like of toner are decided by the content of a release agent, the content is preferably 0.3% by mass or more and 15% by mass or less, more preferably 1% by mass or more and 13% by mass or less, and even more preferably 2% by mass or more and 10% by mass or less in toner.

Examples of the additives like a fluidity modifying agent include a fluidity improver such as silica, alumina and titania which are a fine powder, an inorganic fine powder such as magnetite, ferrite, cerium oxide, strontium titanate and conductive titania, a resistance adjusting agent such as a styrene resin and an acrylic resin, and a lubricant. They are used either as an internal addition agent or an external addition agent.

The content of those additives is preferably 0.05% by mass or more and 10% by mass or less in toner, although it is not particularly limited. As the content of these additives is 0.05% by mass or more, there is a tendency that the effect of modifying the toner performance is obtained at sufficient level. As the content is 10% by mass or less, there is a tendency that favorable image stability of toner is obtained.

EXAMPLES

Herein below, examples of the invention are described but the embodiments of the invention are not limited to them. In addition, the method for evaluating the resin and toner expressed by examples is as described below.

(A) Evaluation Method of Polyester Resin (1) Glass Transition Temperature (Tg)

The temperature at an intersection point of the base line and the endothermic curve near the glass transition temperature on the chart was determined as the measurement is made at a temperature increase rate of 10° C./min by using the differential scanning calorimeter DSC-60 that is manufactured by Shimadzu Corporation.

(2) Softening Temperature (Tm)

The temperature when the ½ amount of 1.0 g of the sample was discharged through a nozzle of 1 mm$\phi$×1 mm under constant rate temperature increase with a load of 196 N (20 Kgf) and a temperature increase rate of 6° C./min was determined by using the flow tester CFT-500D that is manufactured by Shimadzu Corporation.

(3) Acid Value

In a branch Erlenmeyer flask, about 0.2 g of a sample was precisely weighed (A (g)), 20 ml of benzyl alcohol was added thereto, and the resin was dissolved by heating using a heater at 230° C. for 15 minutes under a nitrogen atmosphere. The solution was left to be cooled to room temperature, then 20 ml of chloroform and a few drops of cresol red solution as an indicator were added thereto, and the titration thereof was performed with a 0.02 N KOH solution (titer=B (ml), factor of KOH solution=p). The blank measurement was performed in the same manner as above (titer=C (ml)), and the acid value was calculated according to the following equation. Acid value (mgKOH/g)=(B−C)×0.02×56.11×p÷A (B) Evaluation Method of Toner (4) Storage Stability About 5 g of the toner was weighed and introduced into a sample bottle, and left to stand for 24 hours in a dryer maintained at 50° C., and the extent of the aggregation of the toner was evaluated to be used as an index of blocking resistance. The evaluation criteria were as follows.

A (favorable): dispersed by turning the sample bottle upside down or by tapping 2 to 3 times.

B (usable): dispersed by turning the sample bottle upside down and tapping 4 to 5 times.

C (inferior): not dispersed even by turning the sample bottle upside down and tapping 5 times.

(5) Low Temperature Fixing Property

A solid image of 4.5 cm long×15 cm wide was created as a test pattern at a toner concentration of 0.5 mg/cm$^2$ using a printer which had a fixing roller not coated with silicone oil and of which the roller speed was set to 100 minis and the roller temperature was changeable, and then the image was fixed by setting the temperature of the fixing roller at 145° C. The image density of this test pattern image was measured using the image densitometer manufactured by Macbeth, and recorded. The part to be subjected to the density measurement was folded to have a vertical valley fold, and then, after applying a protective sheet, a 1 kg weight was slid 5 times on the bent portion to yield a crease. Subsequently, the same crease was folded to have a mountain fold, and after applying a protective sheet, a 1 kg weight was slid 5 times on the bent portion. The test paper was stretched, the cellophane tape (NITTO DENKO CS SYSTEM CORPORATION, No. 29) was attached on the bent portion, rubbed 5 times, and slowly peeled off therefrom. The image density was measured by using the image densitometer manufactured by Macbeth. The same measurement was performed at 3 locations, the fixing ratio for each was calculated from the image densities before and after the test by the following equation, and the evaluation was made by the following criteria based on the average fixing ratio of the 3 locations.
Fixing ratio=Image density after test/Image density before test×100(%)
A (very favorable): fixing ratio of 85% or more
B (favorable): fixing ratio of 75% or more and less than 85%
C (inferior): fixing ratio of less than 75% or unmeasurable due to the occurrence of offset phenomenon at 145° C.

(6) Hot Offset Resistance

The lowest temperature at which the toner was transferred to the fixing roller by the hot offset phenomenon at the time of fixing when a solid image of 4.5 cm long×15 cm wide was printed as a test pattern at a toner concentration of 0.5 mg/cm$^2$ for every 5° C. of the roller temperature using a printer, which had a fixing roller not coated with silicone oil and of which the roller speed was set to 30 mm/s and the roller temperature was changeable, was defined as the hot offset occurrence temperature, and the hot offset resistance was determined by using the following criteria.
A (very favorable): hot offset does not occur at 200° C.
B (favorable): hot offset occurrence temperature is higher than 185° C. and 200° C. or lower
C (inferior): hot offset occurrence temperature is 185° C. or lower (7) Image Stability In an environment at 25° C. and 80 RH %, a solid image of 4.5 cm long×15 cm wide was continuously printed as a test pattern at a toner concentration of 0.5 mg/cm$^2$ and a fixing temperature of 170° C. by using a printer which had a fixing roller not coated with silicone oil and of which the roller speed was set to 30 mm/s and the roller temperature was changeable. The change in image between the 1$^{st}$ piece and the 5000$^{th}$ piece was visually evaluated under the following conditions.
A (favorable): there is no change in image density or the influence is minor.
B (usable limit): there is a change in image density and it is the limit allowing a use only after improvement by an additive.
C (inferior): there is a great change in image density.

(8) Solvent Solubility

About 0.5 g of the polyester resin was precisely weighed (Ag) in a branch Erlenmeyer flask and, after adding 50 ml of methyl ethyl ketone or ethyl acetate, it was heated and dissolved for 3 hours in a water bath at 70° C. The solution was filtered by passing it, under aspiration, through a glass filter (Bg) of 1GP100 in which Cellite 545 have been excessively filled and sufficiently dried. By using acetone, solubles in methyl ethyl ketone or ethyl acetate that are remained in the glass filter were sufficiently removed. The glass filter still having remaining insolubles was dried again, and weight of the filter was measured (Cg), and the insolubles were calculated based on the following equation.

Insolubles (% by mass)=$(C-B)/A$×100

Based on the obtained values, evaluation was made in accordance with the following criteria.
A: Insolubles were 3% by mass or less for both of methyl ethyl ketone and ethyl acetate
B: Insolubles were 5% by mass or less for both of methyl ethyl ketone and ethyl acetate
C: Insolubles were more than 5% by mass or less for any one of methyl ethyl ketone and ethyl acetate (9) Method for Measuring Molecular Weight 0.02 g of a sample was precisely weighed in a sample bottle, and by adding tetrahydrofuran, the concentration was adjusted to 0.2% by mass in 10 g. After tight sealing and allowing it to stand overnight for dissolution, it was passed through a membrane filter with pore diameter of 0.5 µm to give a sample solution.

By using HLC-8220GPC manufactured by TOSOH CORPORATION, measurement was made at the following conditions, and the molecular weight value was obtained from the calibration curve which has been established by using 10-point standard polystyrenes.
Temperature control: 40° C.
Column: TSK guard column HXL-H, TSK gel GMHXL×3 manufactured by TOSOH CORPORATION
Flow rate: 1.0 ml/min, sample amount: 100 µl, detector: RI

(10) Method for Evaluating Production Stability

By using the softening temperature increase rate against polycondensation reaction time represented by the following equation, the evaluation was made based on the following criteria.

(Softening temperature of polyester resin at end point of polycondensation reaction: ° C.−Softening temperature of polyester resin before end of polycondensation reaction: ° C.)÷(Polycondensation reaction time: minutes)　　(Equation)

A (favorable): the rate was 0.6° C./minute or less and it was possible to have a sufficient time window in which the resin inside a reaction system exhibits a desired softening temperature.
B (possible to be produced): the rate was more than 0.6° C./minute and the same or less than 0.8° C./min and it was possible to have a time window in which the resin inside a reaction system exhibits a desired softening temperature.
C (poor): the rate was more than 0.8° C./min and it was impossible to have a sufficient time window in which the resin inside a reaction system exhibits a desired softening temperature.

(11) Element (Metal) Analysis

About 2 g of a sample (precisely weighed) was added in a platinum crucible (after melting of lithium borate, completely washed with hydrochloric acid), it was mildly heated for about 6 hours at 150° C. on a hot plate. Then, by heating it in a muffle furnace for 1 hour at 800° C., the organic substances were completely combusted. The obtained sample was then used for EDX test.
<Measurement Conditions>
Device: S-3400N manufactured by SEM Hitachi High-Technologies Corporation: EMAX manufactured by EDX HORTBA, Ltd.
Acceleration voltage: 15 kV
Method for conductive coating: Free of vapor deposit Example 1

The polyhydric carboxylic acid and polyhydric alcohol with injection composition presented in Table 1 were introduced into a reaction vessel equipped with a distillation tower. Subsequently, the rotation number of the stirring wing in the reaction vessel was kept at 200 rpm, raising the temperature was initiated, the reaction system was heated so as to have an inner temperature of 265° C., and this temperature was maintained. An esterification reaction was allowed to occur until there is no distillation of water from the reaction system.

Subsequently, the temperature inside the reaction system was lowered to have the polycondensation reaction temperature shown in Table 1. After collecting a small amount of the content, pressure in the inside of the reaction vessel was lowered over 20 minutes so as to have vacuum degree of 1 kPa or less, and the polycondensation reaction was allowed to occur while diol components were extracted by distillation from the reaction system. The reaction was continued while maintaining the high vacuum state, and the polycondensation reaction was further allowed to occur until the viscosity of the reaction system increases in accordance with an increase in the polymerization degree and the torque of stirring wings shows a value indicating a desired softening temperature. Then, when a predetermined torque is shown, nitrogen was introduced to the reaction system and the stirring was terminated immediately after the nitrogen introduction. According to the nitrogen introduction, the inside of the reaction system was brought back to normal pressure. The reaction product was extracted from the bottom part of the reaction apparatus, and a polyester resin was obtained by cooling. The characteristic values of the obtained polyester resin are shown in Table 1.

Next, the preparation of toner was performed using the polyester resin obtained above. For blending of toner, by using a Henschel mixer, 93 parts by mass of the polyester resin, 3 parts by mass of a quinacridone pigment (manufactured by Clariant, HOSTAPARM PINK E, C.I number: Pigment Red 122), 3 parts by mass of carnauba wax No. 1 (manufactured by TOYO ADL CORPORATION), and 1 part by mass of a negatively chargeable charge control agent (manufactured by Japan Carlit Co., Ltd., trade name: LR-147) were mixed for 5 minutes. Subsequently, the mixture thus obtained was melt kneaded by a twin screw kneader. The melt kneading was performed by setting the inner temperature to the softening temperature of the resin. After kneading, a toner lump was obtained by cooling and it was finely grinded to be 10 μm or less using a jet mill fine pulverizer, and the particle size was put in trim by cutting the fine particles to be 3 μm or less using a classifier. To the 100 parts by mass of the fine powder thus obtained, 0.25 part by mass of silica (manufactured by Nippon Aerosil Co., Ltd., trade name: R-972) was added and mixed together using a Henschel mixer, thereby obtaining finally the toner.

The evaluation was made for the obtained toner by using the evaluation methods that are described above. The evaluation results are presented in Table 1.

Example 2 to Example 6 and Comparative Example 4

The polyester resin was produced in the same manner as in Example 1 except that the polyhydric carboxylic acid and polyhydric alcohol to be introduced to a reaction vessel were changed to those presented in Table 1, and preparation of toner was carried out in the same manner as Example 1. The characteristic values of thus obtained resin and evaluation results of toner are presented in Table 1.

Example 7

The polyester resin was produced in the same manner as in Example 1 except that the polyhydric carboxylic acid and polyhydric alcohol to be introduced to a reaction vessel were changed to those presented in Table 1 and the polymerization catalyst shown in Table 1 was added together with the raw materials, and preparation of toner was carried out in the same manner as Example 1. The characteristic values of thus obtained resin and evaluation results of toner are presented in Table 1.

Comparative Example 1

The polyhydric carboxylic acid and polyhydric alcohol with injection composition shown in Table 1 were added to a reaction vessel equipped with a distillation tower. Subsequently, while maintaining the rotation number of the stirring wing of the reaction vessel at 200 rpm, raising the temperature was initiated and heating was performed such that the temperature inside the reaction vessel reaches 265° C. The temperature was maintained at the same temperature. Because the gellation reaction starts to occur and an increase in the torque in the reaction system starts to show at the end of an esterification reaction and before the disappearance of water distillation from the reaction system, and then an appearance of an accelerated increase in the torque was shown, the stirring was terminated even before the end of the esterification reaction, and according to application of pressure using nitrogen, the content was extracted from the bottom part of the reaction apparatus. Even during the extraction, a continuous increase in viscosity of the content was shown and, as part of the content was solidified inside the reaction apparatus, it cannot be extracted. Furthermore, in the resin which has been extracted, a non-reacted powder raw material has remained in particle shape.

Comparative Example 2

The polyhydric carboxylic acid and polyhydric alcohol with injection composition shown in Table 1 and a polymerization catalyst were added to a reaction vessel equipped with a distillation tower. Subsequently, while maintaining the rotation number of the stirring wing of the reaction vessel at 200 rpm, temperature increase was initiated and heating was performed such that the temperature inside the reaction vessel reaches 265° C. The temperature was maintained at the same temperature. The esterification reaction was allowed to occur until disappearance of water distillation from the reaction system.

Subsequently, the temperature inside the reaction apparatus was lowered and adjusted to the polycondensation temperature shown in Table 1. After collecting a small amount of the content, the inside pressure of the reaction system was lowered. Five minutes after the start of pressure lowering, the vacuum degree reaches 40 kPa and the vacuum degree was kept at the same level. Immediately after the start of pressure lowering, an increase in viscosity in the reaction system was shown. Fifteen minutes after the start of pressure lowering, torque of the stirring wings has increased to the value indicating a desired softening point. Thus, nitrogen introduction to the reaction system was started from that moment and the stirring was terminated immediately after the nitrogen introduction. According to the nitrogen introduction, the inside of the reaction system was brought back to normal pressure. The reaction product was extracted from the bottom part of the reaction apparatus, and the polyester resin was obtained by cooling. Characteristic values of the obtained polyester resin are shown in Table 1.

Next, by using the polyester resin obtained above, preparation of toner was carried out in the same manner as Example 1. The evaluation results of toner are presented in Table 1.

Comparative Example 3

The polyhydric carboxylic acid and polyhydric alcohol with injection composition shown in Table 1 were added to a reaction vessel equipped with a distillation tower. Subsequently, while maintaining the rotation number of the stirring wing of the reaction vessel at 200 rpm, raising the temperature was initiated and heating was performed such that the temperature inside the reaction vessel reaches 265° C. The temperature was maintained at the same temperature. The esterification reaction was allowed to occur until the disappearance of water distillation from the reaction system.

Subsequently, the temperature inside the reaction apparatus was lowered and adjusted to the polycondensation temperature shown in Table 1. After collecting a small amount of the content, the inside pressure of the reaction system was lowered. Five minutes after the start of pressure lowering, the vacuum degree reaches 40 kPa and the vacuum degree was kept at the same level to proceed with the polycondensation reaction. Even after 180 minutes from the start of pressure lowering, torque of the stirring wings has not increased to the value indicating a desired softening point. Thus, nitrogen introduction to the reaction system was started from that moment and the stirring was terminated immediately after the nitrogen introduction. According to the nitrogen introduction, the inside of the reaction system was brought back to normal pressure. The reaction product was extracted from the bottom part of the reaction apparatus, and the polyester resin was obtained by cooling. Characteristic values of the obtained polyester resin are shown in Table 1.

Next, by using the polyester resin obtained above, preparation of toner was carried out in the same manner as Example 1. The evaluation results of toner are presented in Table 1.

From the results of Example 1 to Example 8, if the tri- or higher hydric carboxylic acid component is in a range of 40 mol % or more and 60 mol % or less based on 100 mol % of all acid components and the polymerization catalyst is not used (0 ppm) or used at 100 ppm or less, or molecular weight of 5,000 or less is 38% or more and molecular weight of 200,000 or more is 7% by weight or more according to molecular weight measurement using GPC, the characteristics of the toner in which the obtained toner is used were found to be favorable.

On the other hand, from the results of Comparative Examples 1 and 2, it was shown that if the tri- or higher hydric carboxylic acid component is 35 mol % and less than 40 mol % based on 100 mol % of all acid components, the molecular weight distribution tends to be narrow, and it was difficult to have a low temperature fixing property. Furthermore, form the results of Comparative Example 3, it was shown that, when the tri- or higher hydric carboxylic acid component is 65 mol % and more than 60 mol % based on 100 mol % of all acid components, Tg of the resin to be obtained tends to become lower and it was difficult to have the storage stability.

TABLE 1

|  |  | Example 1 | Example 2 | Example 3 | Example 4 | Example 5 | Example 6 |
|---|---|---|---|---|---|---|---|
| Composition of resin for injection (mol % based on 100 mol % of all acid component) | Terephthalic acid | 60 | 60 | 55 | 55 | 50 | 40 |
| | Trimellitic anhydride | 40 | 40 | 45 | 45 | 50 | 60 |
| | BPA-PO 2.3 mol adduct | 100 | 110 | 100 | 120 | 120 | 140 |
| | Ethylene glycol | 50 | 40 | 55 | 35 | 40 | 40 |
| | Catalyst Type | — | — | — | — | — | — |
| | Additive (ppm) | — | — | — | — | — | — |
| Ratio of bisphenol A alkylene oxide adduct (mol %) based on 100 mol % of alcohol | | 66.7 | 73.3 | 64.5 | 77.4 | 75 | 77.8 |
| Molar ratio of alcohol/acid | | 1.50 | 1.50 | 1.55 | 1.55 | 1.60 | 1.80 |
| Ratio of OH group/COOH group | | 1.25 | 1.25 | 1.27 | 1.27 | 1.28 | 1.38 |
| Condition for polycondensation reaction | Reaction temperature (° C.) | 225 | 225 | 225 | 235 | 225 | 225 |
| | Reaction time (minutes) | 75 | 118 | 46 | 121 | 61 | 98 |
| | Vacuum level (kPa) | ≤1 | ≤1 | ≤1 | ≤1 | ≤1 | ≤1 |
| Progress state of polycondensation reaction | Increase in softening temperature (° C.) from the moment before start of poly condensation reaction to the end of polycondensation reaction | 18 | 19 | 22 | 24 | 21 | 32 |
| | Rate of increase in softening temperature (° C./minute) | 0.24 | 0.16 | 0.48 | 0.20 | 0.34 | 0.33 |
| Evaluation of production stability | | A | A | A | A | A | A |
| Measured value of resin composition (mol %) | Terephthalic acid | 60 | 60 | 55 | 55 | 51 | 41 |
| | Trimellitic anhydride | 40 | 40 | 45 | 45 | 49 | 59 |
| | BPA-PO 2.3 mol adduct | 100 | 110 | 100 | 120 | 120 | 140 |
| | Ethylene glycol | 46 | 35 | 51 | 31 | 36 | 35 |
| Physical property of resin | Tg (° C.) | 58.4 | 58.4 | 54.9 | 57 | 57.1 | 53.3 |
| | Softening temperature (° C.) | 114 | 117 | 113 | 116 | 111 | 118 |
| | Acid value (mgKOH/g) | 16.6 | 14.4 | 19.3 | 15.5 | 14.1 | 15.6 |
| | Solvent solubility | A | A | A | A | A | A |
| Ratio of molecular weight range (% by weight) | Resin ≤5,000 | 45.2 | 44 | 45.2 | 45 | 45.7 | 47.7 |
| | ≥200,000 | 10.9 | 11.5 | 11.8 | 12.2 | 11.7 | 12.6 |
| | Kneading ≤5,000 | 45 | 43.5 | 44.9 | 44.9 | 45.7 | 47.7 |
| | ≥200,000 | 9.2 | 9.7 | 9.9 | 10.1 | 9.2 | 10.2 |
| Evaluation of toner characteristics | Storage stability | B | B | C | B | B | C |
| | Low temperature fixing property | B | B | A | B | B | B |
| | Hot offset resistance | B | B | B | B | B | A |
| | Image stability | A | A | B | A | A | A |

|  |  | Example 7 | Example 8 | Comparative Example 1 | Comparative Example 2 | Comparative Example 3 |
|---|---|---|---|---|---|---|
| Composition of resin for injection (mol % based on 100 | Terephthalic acid | 60 | 60 | 65 | 65 | 35 |
| | Trimellitic anhydride | 40 | 40 | 35 | 35 | 65 |
| | BPA-PO 2.3 mol adduct | 100 | 100 | 100 | 100 | 145 |
| | Ethylene glycol | 50 | 50 | 45 | 45 | 40 |

TABLE 1-continued

| | | | | | | |
|---|---|---|---|---|---|---|
| mol % of all acid component) | Catalyst | Type | Tetrabutyl titanate | Tetrabutyl titanate | Tetrabutyl titanate | Tetrabutyl titanate | — |
| | | Additive (ppm) | 16 | 78 | 72 | 72 | — |
| Ratio of bisphenol A alkylene oxide adduct (mol %) based on 100 mol % of alcohol | | | 66.7 | 66.7 | 69 | 69 | 78.4 |
| Molar ratio of alcohol/acid | | | 1.50 | 1.50 | 1.45 | 1.45 | 1.85 |
| Ratio of OH group/COOH group | | | 1.25 | 1.25 | 1.23 | 1.23 | 1.40 |
| Condition for polycondensation reaction | Reaction temperature (° C.) | | 225 | 225 | 225 | 225 | 225 |
| | Reaction time (minutes) | | 55 | 15 | 50 | 22 | 113 |
| | Vacuum level (kPa) | | ≤1 | 40 | ≤1 | ≤1 | ≤1 |
| Progress state of polycondensation reaction | Increase in softening temperature (° C.) from the moment before start of poly condensation reaction to the end of polycondensation reaction | | 17 | 11 | 10 | 4 | 20 |
| | Rate of increase in softening temperature (° C./minute) | | 0.31 | 0.73 | 0.20 | 0.18 | 0.18 |
| Evaluation of production stability | | | A | B | A | A | A |
| Measured value of resin composition (mol %) | Terephthalic acid | | 60 | 60 | 65 | 65 | 36 |
| | Trimellitic anhydride | | 40 | 40 | 35 | 35 | 64 |
| | BPA-PO 2.3 mol adduct | | 100 | 100 | 100 | 100 | 145 |
| | Ethylene glycol | | 46 | 46 | 40 | 42 | 38 |
| Physical property of resin | Tg (° C.) | | 58.2 | 58 | 60 | 57.2 | 49.4 |
| | Softening temperature (° C.) | | 111 | 112 | 116 | 110 | 105 |
| | Acid value (mgKOH/g) | | 16.1 | 14.9 | 14.5 | 17.2 | 15.5 |
| | Solvent solubility | | A | A | A | A | A |
| Ratio of molecular weight range (% by weight) | Resin | ≤5,000 | 45.8 | 45.9 | 37.2 | 49.2 | 49.5 |
| | | ≥200,000 | 10.6 | 10.7 | 10 | 0.5 | 10.2 |
| | Kneading | ≤5,000 | 45.5 | 45.5 | 37.2 | 49.5 | 49.7 |
| | | ≥200,000 | 8.6 | 8.9 | 8.3 | 0.2 | 8.3 |
| Evaluation of toner characteristics | Storage stability | | B | B | B | B | D |
| | Low temperature fixing property | | B | B | C | B | A |
| | Hot offset resistance | | B | B | B | C | B |
| | Image stability | | A | A | A | A | B |

BPA-PO 2.3 adduct polyoxypropylene-(2.3)-2,2-bis(4-hydroxyphenyl)propane

The invention claimed is:

1. A polyester resin, comprising:
   40 mol % or more and 60 mol % or less of structural units derived from tri- or higher hydric carboxylic acid based on 100 mol % of structural units derived from all acid components, and
   144 parts by mol or more and 182 parts by mol or less of structural units derived from all alcohol components based on 100 parts by mol of structural units derived from all acid components,
   wherein
   a softening temperature of the polyester resin is 125° C. or lower, and
   a content of a metal in the polyester resin is 100 ppm or less.

2. The polyester resin according to claim 1, wherein the metal is at least one selected from the group consisting of Ti, Sb, Sn, Ge, Al, Zr, Mg, Zn, Ca, and P.

3. A polyester resin, comprising:
   a first component having a molecular weight of 5,000 or less in an amount of 38% by weight or more, and
   a second component having a molecular weight of 200,000 or more in an amount of 7% by weight or more,
   wherein a glass transition temperature of the polyester resin is 50° C. or higher, and the molecular weight is measured by GPC measurement.

4. The polyester resin according to claim 1, further comprising:
   90 mol % or more of the structural units derived from bisphenol A alkylene oxide adduct based on 100 mol % of structural units derived from all acid components.

5. The polyester resin according to claim 4, wherein the bisphenol A alkylene oxide adduct comprises a bisphenol A propylene oxide adduct.

6. The polyester resin according to claim 1, further comprising:
   insolubles, in methyl ethyl ketone and ethyl acetate, of less than 5% by mass.

7. A method for producing the polyester resin according to claim 1,
   polymerizing a carboxylic acid component comprising 40 mol % or more and 60 mol % or less of tri- or higher hydric carboxylic acid component based on 100 mol % of all acid components, and an alcohol component in the presence of 100 ppm or less of a polymerization catalyst,
   wherein the polymerization is conducted in a ratio of hydroxyl groups in all alcohol components to carboxy groups in all acid components being 1.20 or more and 1.40 or less to 1.

8. The method according to claim 7, wherein the alcohol component comprises 60 mol % or more and 80 mol % or less of bisphenol A alkylene oxide adduct when all alcohol components is 100 mol %.

9. The method according to claim 8, wherein the bisphenol A alkylene oxide adduct comprises a bisphenol A propylene oxide adduct.

10. A toner, comprising:
   the polyester resin according to claim 1.

11. The toner according to claim 10, wherein the toner is a chemical toner.

12. The polyester resin according to claim 3, further comprising:
   90 mol % or more of the structural units derived from bisphenol A alkylene oxide adduct based on 100 mol % of structural units derived from all acid components.

13. The polyester resin according to claim 12, wherein the bisphenol A alkylene oxide adduct comprises a bisphenol A propylene oxide adduct.

14. The polyester resin according to claim 3, wherein a softening temperature of the polyester resin is 125° C. or lower.

15. The polyester resin according to claim 3, further comprising:
   insolubles, in methyl ethyl ketone and ethyl acetate, of less than 5% by mass.

16. The polyester resin according to claim 1, wherein the all alcohol components are bi-alcohols.

\* \* \* \* \*